(12) United States Patent
Duffield et al.

(10) Patent No.: US 8,233,402 B2
(45) Date of Patent: *Jul. 31, 2012

(54) MULTICAST-BASED INFERENCE OF TEMPORAL LOSS CHARACTERISTICS IN PACKET DATA NETWORKS

(75) Inventors: Nicholas Geoffrey Duffield, Summit, NJ (US); Vijay Arya, South Yarra (AU); Darryl Neil Veitch, Fitzroy (AU)

(73) Assignee: AT&T Intellectual Property II, L.P., Atlanta, GA (US)

( * ) Notice: Subject to any disclaimer, the term of this patent is extended or adjusted under 35 U.S.C. 154(b) by 171 days.

This patent is subject to a terminal disclaimer.

(21) Appl. No.: 11/903,169

(22) Filed: Sep. 20, 2007

(65) Prior Publication Data

US 2009/0080340 A1 Mar. 26, 2009

(51) Int. Cl.
*H04J 1/16* (2006.01)
(52) U.S. Cl. ......................................... 370/252
(58) Field of Classification Search ........... 370/241–253
See application file for complete search history.

(56) References Cited

U.S. PATENT DOCUMENTS

| | | | |
|---|---|---|---|
| 4,860,201 A * | 8/1989 | Stolfo et al. | 712/11 |
| 5,519,837 A * | 5/1996 | Tran | 710/111 |
| 5,727,002 A * | 3/1998 | Miller et al. | 714/748 |
| 6,732,182 B1 | 5/2004 | Beverly, IV | |
| 6,839,754 B2 | 1/2005 | Nowak et al. | |
| 6,850,491 B1 * | 2/2005 | Firoiu et al. | 370/235 |
| 7,376,045 B2 * | 5/2008 | Falkenberg et al. | 367/19 |
| 2003/0147386 A1 | 8/2003 | Zhang et al. | |
| 2004/0071095 A1 * | 4/2004 | Raisanen | 370/252 |
| 2006/0159023 A1 * | 7/2006 | Hickey et al. | 370/241 |

OTHER PUBLICATIONS

Baccala, Brent. Connected: An Internet Encyclopedia. <http://web.archive.org/web/20030625010652/http://www.freesoft.org/CIE/Topics/53.htm>. Jun. 25, 2003.*
R. Caceres, et al., "Multicast-Based Inference of Network-Internal Loss Characteristics," IEEE Transactions in Information Theory, vol. 45, pp. 26-45, 2002.
N.G. Duffield, et al., "Multicast Topology Inference from Measured End-to-End Loss," IEEE Transactions in Information Theory, vol. 48, pp. 26-45, 2002.
T. Bu, et al., "Network Tomography on General Topologies," Proceedings ACM Sigmetrics 2002, Marina Del Rey, CA, Jun. 15-19, 2002.
F. Lo Presti, et al., "Multicast-based Inference of Network-Internal Delay Distributions," IEEE/ACM Transactions on Networking, vol. 10(6), pp. 761-775, 2002.

* cited by examiner

*Primary Examiner* — Raj Jain
*Assistant Examiner* — Ashil Farahmand (57) ABSTRACT

Disclosed are method and apparatus for characterizing the temporal loss characteristics of a packet data network by multicast-based inference. Multicast probes are transmitted from a source node to a plurality of receiver nodes, which record the arrivals of the multicast probes. From the aggregate data comprising recorded arrivals of the end-to-end paths from the source node to each receiver node, temporal loss characteristics of individual links within the network may be calculated. In a network with a tree topology, the complexity of calculations may be reduced through a process of subtree partitioning.

10 Claims, 6 Drawing Sheets

MULTICAST-BASED INFERENCE OF TEMPORAL LOSS CHARACTERISTICS IN PACKET DATA NETWORKS

CROSS-REFERENCE TO RELATED APPLICATION

This application is related to U.S. patent application Ser. No. 11/903,158 filed on Sep. 20, 2007, entitled Multicast-Based Inference of Temporal Delay Characteristics in Packet Data Networks, and published as U.S. Patent Application Publication No. US 2009/0080339 on Mar. 26, 2009, which is being filed concurrently herewith and which is herein incorporated by reference in its entirety.

BACKGROUND OF THE INVENTION

The present invention relates generally to network characterization of packet loss, and more particularly to network characterization of packet loss by multicast-based inference.

Packet data networks, such as Internet Protocol (IP) networks, were originally designed to transport basic data in a packetized format. Increasingly, however, other services, such as voice over IP (VoIP) and video on demand (VOD), are utilizing packet data networks. These services, in general, have more stringent requirements for network quality of service (QoS) than basic data transport. Depending on the application, QoS is characterized by different parameters. An important one is packet loss. For example, in some data transport protocols such as TCP, packets which are lost are re-transmitted. Services such as VoIP, however, operate in real time (or, at least, near-real time). Lost packets typically are not re-transmitted, and an excessive number of lost packets will result in poor voice quality. Even if only data is being transported, competing services using the same transport network may have different QoS requirements. For example, near-real time system control will have more stringent loss requirements than download of music files. In some instances, QoS requirements are set by service level agreements between a network provider and a customer.

Measurement of various network parameters is essential for network planning, architecture, administration, and diagnostics. Some parameters may be measured directly by network equipment, such as routers and switches. Since different network providers typically do not share this information with other network providers and with end users, however, system-wide information is generally not available to a single entity. Additionally, the measurement capabilities of a piece of network equipment are typically dependent on proprietary network operation systems of equipment manufacturers. The limitations of internal network measurements are especially pronounced in the public Internet, which comprises a multitude of public and private networks, often stitched together in a haphazard fashion.

A more general approach to network characterization, therefore, needs to be independent of measurements captured by equipment internal to the transport network. That is, the measurements need to be performed by user-controlled hosts attached to the network. One approach is for one host to send a test message to another host to characterize the network link between them. A standard message widely utilized in IP networks is a "ping". Host A sends a ping to Host B. Assuming that Host B is operational, if the network connection between Host A and Host B is operational, then Host A will receive a reply message from Host B. If Host A does not receive a reply within a user-defined timeout interval, it declares the message to have been lost. Pings are examples of point-to-point messages between two hosts. As the number of hosts connected to the network increases, the number of point-to-point test messages increases to the level at which they are difficult to administer. They may also produce a significant load on both the hosts and the transport network. A key requirement of any test tool is that it must not corrupt the system under test. In addition to the above limitations, in some instances, pings may not provide the level of network characterization required for adequate network planning, architecture, administration, and diagnostics.

What is needed is a network characterization tool which provides detailed parameters on the network, runs on hosts controlled by end users, and has minimal disturbance on the operations of the hosts and transport network.

BRIEF SUMMARY OF THE INVENTION

Temporal loss characteristics in packet data networks are characterized by multicast-based inference. A packet data network comprises a set of nodes connected by a set of paths. Each path may comprise a set of individual links. In multicast-based inference, multiple test messages (probes) are multicast from a source node to a set of receiver nodes. Each individual receiver node records the arrivals of the probes transmitted along an end-to-end path from the source node to the individual receiver node. From the aggregate arrival data collected by the set of receiver nodes, temporal loss characteristics of individual links may be calculated. In addition to average loss per unit time, temporal characteristics comprise parameters such as number of consecutive losses and number of consecutive successful transmissions. In embodiments in which the topology of the packet data networks is a tree, calculations may be simplified by a process of subtree partitioning.

These and other advantages of the invention will be apparent to those of ordinary skill in the art by reference to the following detailed description and the accompanying drawings.

DETAILED DESCRIPTION

Figure 1:
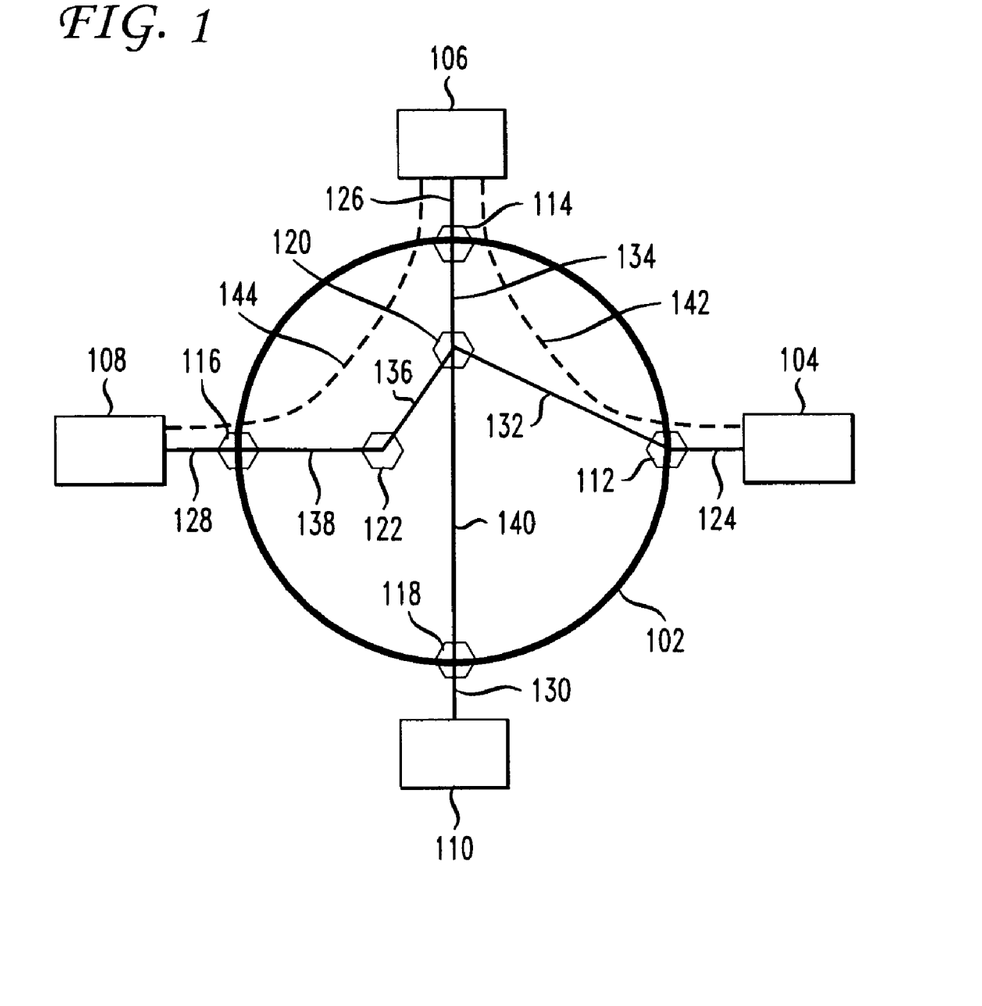
FIG. 1 shows a schematic of a packet data communications system.

FIG. 1 shows a network architecture schematic of an example of a communications system comprising packet data network 102 and end-user nodes 104-110. Within packet data network 102 are edge nodes 112-118 and intermediate nodes 120 and 122. An edge node connects an end-user node to a packet data network. An intermediate node connects nodes within a network. In some instances, a node may serve as both an edge node and an intermediate node. Herein, an edge node and an intermediate node are considered to be logically equivalent, and "intermediate nodes" comprise both intermediate nodes and edge nodes. Herein, "nodes" comprise both physical nodes and logical nodes. An example of a physical end-user node is a host computer. An example of a logical end-user node is a local area network. An example of a physical intermediate node is a router. An example of a logical intermediate node is a subnetwork of routers, switches, and servers. In all instances, an end user may access and control an end-user node. Access and control policies for an intermediate node, however, are set by a network provider, which, in general, is a different entity from an end user. In general, an end user may not have permission to access and control an intermediate node.

Nodes are connected via network links, which comprise physical links and logical links. In FIG. 1, links 124-140 represent physical links. Examples of physical links include copper cables and optical fiber. Links 142 and 144 represent logical links. For example, logical link 142 represents an end-to-end network link along which data is transmitted between end-user node 106 and end-user node 104. Logical link 142 comprises physical links 126, 134, 132, and 124. A logical link may further comprise segments which are also logical links. For example, if intermediate node 114 is a router, there is both a physical link for signal transport across the router and a logical link for data transport across the router. Logical links may span multiple combinations of end-user nodes and intermediate nodes. Logical links may span multiple networks. Since a physical link may also be considered a logical link, a network link may also be referred to herein simply as a "link". Herein, an end-to-end network link connecting one node to another node may also be referred to as a "path". A path may comprise multiple links.

In an embodiment, characterization of packet data network 102 is performed by multicasting test messages from a source node (for example, end-user node 106) to receiver nodes (for example, end-user nodes 104, 108, and 110). Analysis of the test messages transmitted from source node 106 and received by a specific receiver node (for example, node 104) yields characteristics of the path from the source node 106 to the specific receiver node 104. In addition, test messages received at all the receiver nodes may be aggregated to infer characteristics of internal network links. For example, in FIG. 1, test messages transmitted from the source node 106 to receiver nodes 104, 108, and 110 all must pass through the common network link defined by (link 126—node 114—link 134—node 120). Thus, if test messages are received at any one of the receiver nodes 104, 108, and 110, then source 106, link 126, node 114, link 134, and node 120 are all operational. (The assumption here is that if a node is operational for one link passing through it, it is operational for all links passing through it. In some instances, this assumption may not hold.) If receiver node 108 receives the test messages, but receiver node 104 does not, then it can be inferred that transmission failed along the network link defined by (link 132—node 112—link 124).

The process of characterizing a packet data network by multicasting test messages from a source node and analyzing the aggregate of test messages received by multiple receiver nodes is referred to herein as "multicast-based inference of network characteristics (MINC)". Previous applications of MINC characterized average packet loss. See, for example, R. Caceres et al., "Multicast-Based Inference of Network-internal Loss Characteristics," IEEE Transactions in Information Theory, vol. 45, pp. 26-45, 2002. (Herein, "packet loss" will be referred to simply as "loss".) Average loss, however, provides only coarse characterization of network loss characteristics. It is well known, for example, that packet data networks are susceptible to noise (for example, electromagnetic interference), which may cause packets to be lost. Losses may be much greater during a noise burst than during quasi-quiet periods. It is also well known, for example, that traffic in packet data networks is bursty. Traffic congestion may cause packets to be lost. Losses may be much greater during heavy traffic load than during light traffic load. Simple average values of loss, therefore, do not adequately capture network characteristics. Advantageous procedures for MINC described herein expand the range of network characterization to include temporal loss characteristics of packet data networks. Herein, "temporal loss characteristics" refer to patterns of network loss as a function of time. Examples of temporal loss characteristics are discussed below.

Figure 2:
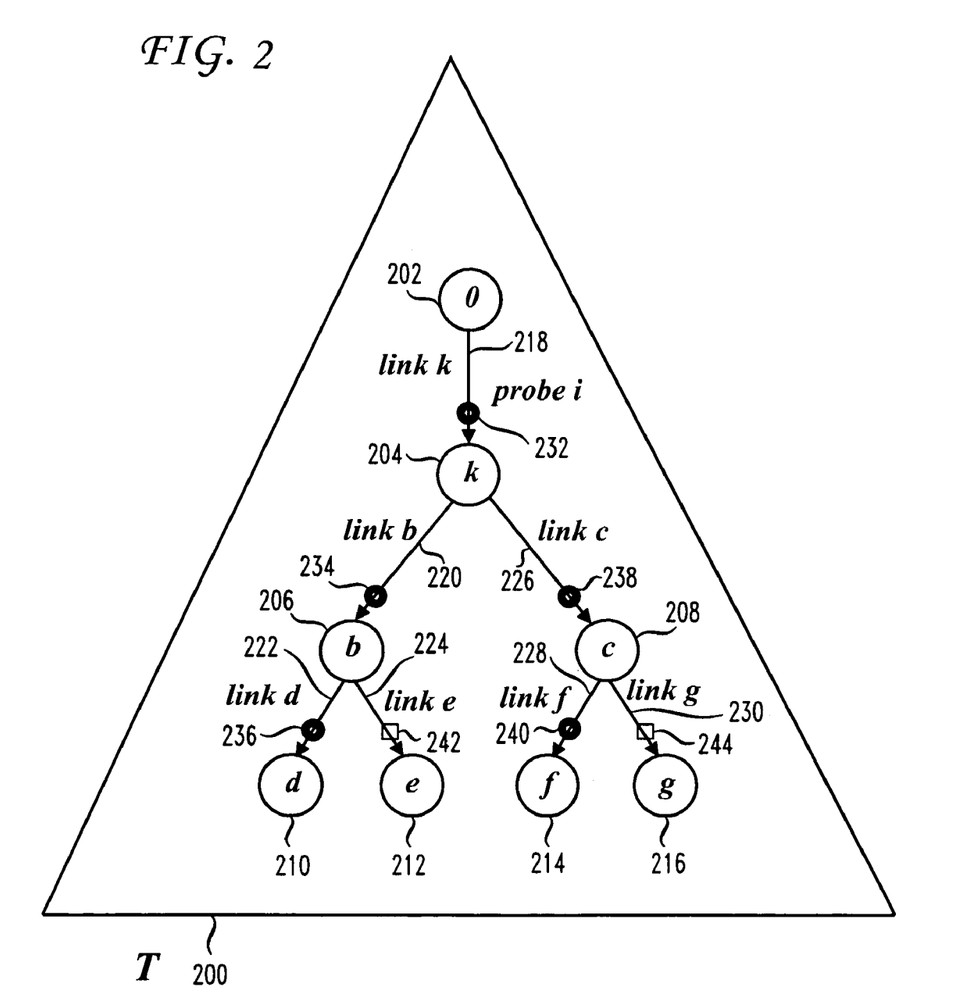
FIG. 2 shows a schematic of a tree topology of a network.

Advantageous procedures for MINC are illustrated herein for packet data networks with a tree topology. FIG. 2 shows a graphical representation of a network viewed as a logical multicast tree T 200 comprising a set V of nodes 202-216, V={0, k, b-g}, and a set L of links 218-230, L={link k, link b-link g}. In the tree model, node 0 202 is the root node; node k 204, node b 206, and node c 208 are branch nodes; and node d 210-node g 216 are leaf nodes. Herein, a branch node in a tree model, as illustrated in FIG. 2, is equivalent to an intermediate node in a network architecture model, as illustrated in FIG. 1. Herein, the following genealogical terminology is also used: Node k 204 is a "child" of root node 0 202; node b 206 and node c 208 are "children" of node k 204; node d 210 and node e 212 are children of node b 206; and node f 214 and node g 216 are children of node c 208. Other examples of genealogical terminology used herein include: node b 206 is the "father" of node d 210; and node b 206, node k 204, and root node 0 202 are all "ancestors" of node d 210.

In the tree model illustrated in FIG. 2, the network topology is known to the end user. One skilled in the art may develop other embodiments which apply to networks in which the network topology is not a priori known to the end user. See, for example, N. G. Duffield et al., "Multicast Topology Inference from Measured End-to-End Loss," IEEE Transactions in Information Theory, vol. 48, pp. 26-45, 2002. In a tree model, a non-root node node l receives messages from one and only one node, referred to as the unique father node f(l) of node l. One skilled in the art may develop other embodiments to characterize networks in which a specific node may have more than one father node. See, for example, T. Bu et al., "Network Tomography on General Topologies," Proceedings ACM Sigmetrics 2002, Marina Del Rey, Calif., Jun. 15-19, 2002.

In MINC, test messages are multicast from a single source node to multiple destination nodes, which are the receiver nodes under test. In FIG. 2, the single source node is root node 0 202, and the destination nodes are leaf nodes node d 210-node g 216. An end user has access to, and control of, source and receiver nodes. Herein, "test messages" may also be referred to as "probe messages". To simplify the terminology further, "probe messages" may also be referred to as "probes". In a multicast transmission, a probe is replicated at branch nodes. Separate copies are then forwarded to other branch nodes and to the destination nodes. In an example, packet data network 102 comprises an Internet Protocol (IP) network. A probe comprises one or more packets in which the source IP address is that of source node root node 0 202, and the destination IP addresses are those of leaf nodes node d 210-node g 216. Typically, the IP addresses of node d 210-node g 216 are defined elements in a multicast group, which, for example, may be a range of addresses in a multicast subnet.

As shown in FIG. 2, probe i 232, where i is an integer 1, 2, 3 . . . , is transmitted from the source node root node 0 202 to branch node node k 204, which then transmits a copy of the probe, shown in the figure as 234, to branch node node b 206.

Branch node node k 204 transmits another copy of the probe, shown in the figure as 238, to branch node node c 208. Herein, the term "probe" comprises both the original probe transmitted from the source node root node 0 202, and copies of the probe transmitted to branch nodes and destination nodes. The network parameter under test is loss (within a specified time interval). In FIG. 2, probes which are successfully transmitted are indicated as circles, 232-240. Probes which are lost are indicated as squares, 242 and 244. In this example, the probe reaches branch nodes, node k 204, node b 206, and node c 208. The probe further reaches destination nodes, node d 210 and node f 214; but the probe does not reach destination nodes, node e 212 and node g 216. A series of probes is used to measure the time dependence of network parameters. Note that the time interval between consecutive probes does not need to be constant. Herein, in measurements of loss, a destination node records (also referred to as "observes") the "arrival" of a probe message. If a probe message does not arrive at a destination node within a user-defined interval, the destination node declares the probe message to be lost.

When the network parameter under test is loss, the multicast process is characterized by node states and link processes. The source node root node 0 202 transmits a discrete series of probes probe i, where the index i is an integer 1, 2, 3 . . . . The node state $X_l(i)$ indicates whether probe i has arrived at node l. The value $X_l(i)=1$ indicates that probe i has arrived at node l. The value $X_l(i)=0$ indicates that probe i has not arrived at node l, and has therefore been lost. In FIG. 2, probe i successfully arrived at node k 204-node d 210, and node f 214. The probe did not arrive at node e 212 and node g 216. Therefore, $X_k(i)=X_b(i)=X_c(i)=X_d(i)=X_f(i)=1$; and $X_e(i)=X_g(i)=0$.

The link process $Z_l(i)$ indicates whether link l is capable of transmission during the interval in which probe i would attempt to reach node l, assuming that probe i were present at the father node f(l). The value $Z_l(i)=1$ indicates that the link is capable of transmission. The value $Z_l(i)=0$ indicates that the link is not capable of transmission. If node R is a destination node which is a receiver node under test, then $X_R(i)$ provides loss statistics on the end-to-end path connecting source node root node 0 to node R. The aggregate data collected from a set of receiver nodes {node R} characterizes the set of end-to-end paths from source node root node 0 to each receiver node. In one procedure, MINC analyzes aggregate data to infer temporal characteristics of loss processes determining the link processes $Z_l=\{Z_l(i)\}$ along individual links internal to the network. Examples of model link loss processes $Z_l=\{Z_l(i)\}$ include Bernoulli, On-Off, and Stationary Ergodic Markov Process of Order r.

Figure 3:
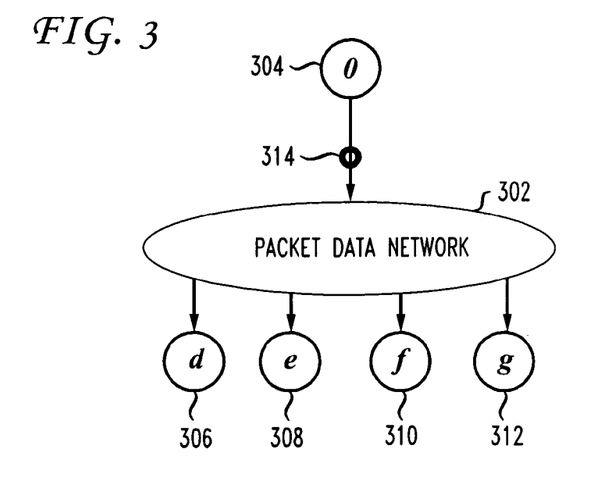
FIG. 3 shows a schematic of a network test architecture.
Figure 4:
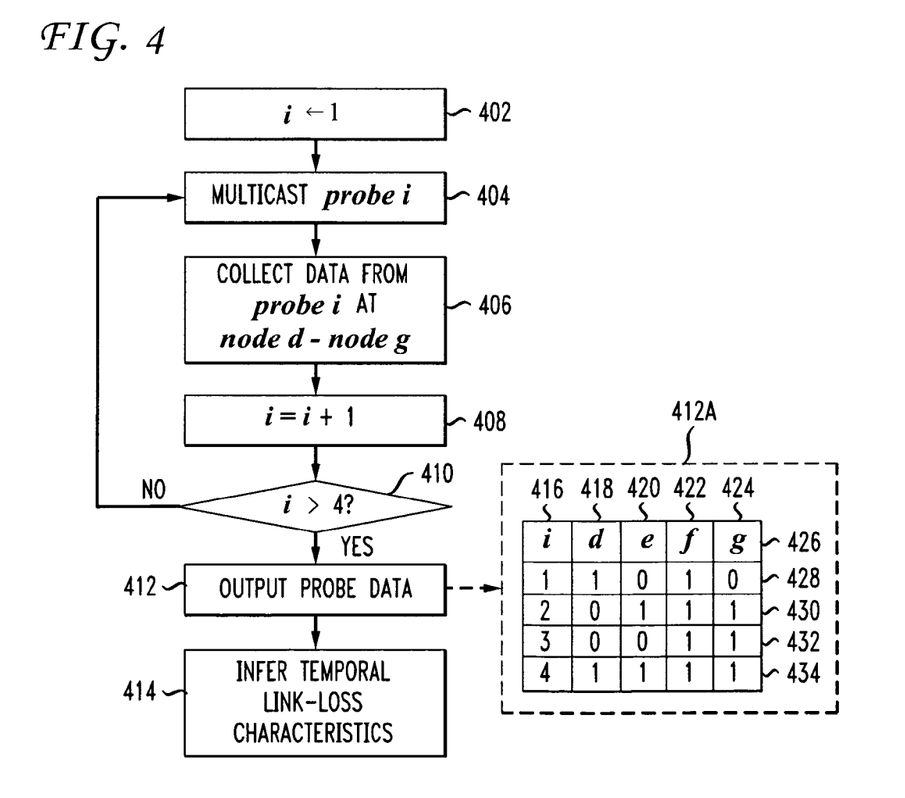
FIG. 4 shows a flow chart of a multicast-based temporal link loss network characterization process.

An example of a MINC process, in which the parameter under test is loss, is illustrated in FIG. 3 and described in the corresponding flow chart shown in FIG. 4. FIG. 3 shows a network schematic of a communications system comprising packet data network 302, source root node 0 304, and destination nodes node d 306-node g 312. The circle 314 represents a probe. In the simple example described in the flow chart shown in FIG. 4, a series of four probes are multicast from source root node 0 304 to destination nodes node d 306-node g 312. In actual test runs, the number of probes is much greater than 4. A test run may comprise 10,000 probes, for example.

In step 402, the probe index i is initialized to 1. In step 404, source root node 0 304 multicasts probe i 314 to destination nodes node d 306-node g 312. In step 406, each individual destination node, node d 306-node g collects data from probe i 314. In this instance, the data comprises records (observations) of whether the probe has arrived at a destination node.

The data is collected in a database which may be programmed in source root node 0 304, destination nodes node d 306-node g 312, or on a separate host which may communicate with root node 0 304 and destination nodes node d 306-node g 312. In step 408, the probe index i is incremented by 1. In step 410, the process returns to step 404, and steps 404-408 are iterated until four probes have been multicast. The process then continues to step 412, in which the probe data is outputted. In step 414, temporal link-loss characteristics of packet data network 402 are inferred from the probe data outputted in step 412. Details of the inference process are discussed below.

An example of data outputted in step 412 is shown in table 412A, which comprises columns (col.) 416-424 and rows 426-434. In row 426, the column headings indicate probe index i col. 416 and destination nodes node d col. 418-node g col. 424. Column 416, rows 428-434, tracks the probes, probe i, i=1-4. The entries in rows 428-434, col. 418-424, track the set of node states $X_l=\{X_l(i)\}$, where l=d-g and i=1-4. A node state has the value 1 if the probe arrived (was received), and the value 0 if the probe was lost (was not received).

The process illustrated in the flow chart shown in FIG. 4 is a discrete time loss model with the following loss dependence structure:

Spatial. A loss process on one link is independent of the loss process on any other link.

Temporal. In previous applications of MINC, a loss process within a single link is independent of time. In advantageous procedures described herein, this constraint is removed, and a larger range of network characteristics may be analyzed. A loss process on any link (except for the link starting from the root node 0) is stationary and ergodic. That is, within a link, packet losses may be correlated, with parameters that in general depend on the link.

In examples discussed herein, the temporal characteristics under test comprise measurements of "pass-runs" and "loss-runs" across a link within packet data network 302. Herein, a "pass" refers to a probe which has been successfully transmitted across a link and arrives at a destination node. A "loss" refers to a probe which has been lost during transmission across a link. A "pass-run" refers to a consecutive sequence of passes delimited by a loss before the first pass of the pass-run and a loss after the last pass of the pass-run. Similarly, a "loss-run" refers to a consecutive sequence of losses delimited by a pass before the first loss of the loss-run and a pass after the last loss of the loss-run. As an example, the following sequential data may be collected: a pass-run of 5,000 probes; a loss-run of 2000 probes; a pass-run of 50,000 probes; and a loss-run of 100 probes.

As discussed above, average loss (in a specified time interval) does not provide adequate characterization of links. Examples of more detailed temporal loss characteristics of a link include the mean length of a pass-run, the mean length of a loss-run, and the probability that the length of a pass-run or loss-run exceeds a specific value. As discussed above, advantageous procedures process the aggregate data recorded (collected) from probes received at the destination nodes to estimate the link-loss parameters of interest for individual links within the network. As discussed above, a "path" is an end-to-end network link connecting one node to another node. A path may comprise multiple links. Herein, "path passage" refers to successful transmission of a probe across a path. Herein, "link passage" refers to successful transmission of a probe across a link. Individual link passage characteristics are inferred from path passage characteristics. Below, a system of equations describing path passage characteristics as functions of link passage characteristics is first derived. The path passage characteristics are values which are calculated from the aggregate data. Solutions to the system of equations then yield the link passage characteristics. In some instances, the solutions are approximate, and the approximate solutions yield estimates of the link passage characteristics.

As an example, let $P_k$ be a random variable taking the marginal distribution of a pass-run, then the mean pass-run length is:

$$E[P_k] = \sum_{j\geq 1} jPr[P_k = j] = \qquad \text{(Eqn 1)}$$

$$\sum_{j\geq 1} Pr[P_k \geq j] = \frac{Pr[Z_k(1) = 1]}{Pr[Z_k(1) = 1] - Pr[Z_k(0) = 1, Z_k(1) = 1]},$$

where E[•] means expected value and Pr[•] means probability of [•]

Similarly, values such as mean loss-run length, probability that a pass-run is greater than a specified value, and probability that a loss-run is greater than a specified value may be calculated.

Methods to estimate parameters of interest are described herein. The following parameters and functions are defined herein:

$$I = \{i_1, i_2, \ldots i_s\}, \text{ where } s \text{ is an integer, } s \geq 1, \qquad \text{(Eqn 2)}$$

is a set of time indices at which probes are transmitted. It is a generalization of a simple sequence i=1, 2, 3 . . . . That is, the time indices do not need to be equally spaced or even contiguous. For example, data may be collected from probe 7, probe 10, and probe 27.

$X_l(I)$ is a pattern of probes, corresponding to the index set I, which survived to node l.

$$X_l(I) = \{\{X_l(i)\}: X_l(i_1) = X_l(i_2) = \ldots X_l(i_s) = 1\} \qquad \text{(Eqn 3)}$$

$Z_l(I)$ is a link passage mask, defined such that probes with indices in I, if present at node f(l), will pass to node l, where node f(l) is the father of node l.

$$Z_l(I) = \{\{Z_l(i)\}: Z_l(i_1) = Z_l(i_2) = \ldots Z_l(i_s) = 1\} \qquad \text{(Eqn 4)}$$

Link pattern passage probability is defined by $$\alpha_l(I) = Pr[Z_l(I)] = Pr[X_l(I)|X_{f(l)}(I)] \qquad \text{(Eqn 5)}$$

That is, if a probe has reached the father node node f(l), $\alpha_l$ is the probability that the probe will reach node l across link l.

Path pattern probability is defined by $$A_l(I) = Pr[X_l(I)] = \alpha_l(I) A_{f(l)}(I) \qquad \text{(Eqn 6)}$$

That is, $A_l$ is the probability that the probe has successfully reached node l across the full path from root node to node l.

In this instance, the path pattern probability is equal to the product of the link pattern probabilities of the individual links from root node 0 to node l:

$$\mathcal{A}_l(I) = \prod_{w \in a(l)} \alpha_w(I) \qquad \text{(Eqn 7)}$$

where a(l) is the set of ancestors of node l.

An example is discussed with respect to the tree model previously shown in FIG. 2. The source node is root node 0 202. The source node multicasts a sequence of four probes. In Eqn 2, I={$i_1$=1, $i_2$=2, $i_3$=3, $i_4$=4}. The receiver nodes which collect the probes are the destination leaf nodes, node d 210-node g 216. Consider node l=node b C06. In Eqn 4 and Eqn 5, the father node node f(b) of node b 206 is node k C04. In Eqn 7, the set of ancestors of node b 206 is a(b)={node k 204, node 0 202}.

Assume that probe 1-probe 4 all arrive at node k 204. Then, in Eqn 3, $X_k(I) = \{X_k(1) = X_k(2) = X_k(3) = X_k(4) = 1\}$. Further assume that probe 1, probe 2, and probe 3 all arrive at node b 206, but probe 4 is lost. In this instance, in Eqn 4, $Z_b(I) = \{Z_b(1) = Z_b(2) = Z_b(3) = 1\}$, and, at node b 206, $X_b(I) = \{X_b(1) = X_b(2) = X_b(3) = 1\}$. In Eqn 5, the link pattern passage probability is $\alpha_b(I) = Pr[Z_b(I)] = Pr[X_b(I)|X_k(I)]$. Or, in terms of this simple example, if probe 1 arrives at node k 204, the probability of probe 1 arriving at node b is equal to the probability that the link passage probability across link b 220 is 1. A similar analysis applies for the other probes and other nodes.

In Eqn 7, now consider node l=node d 210, one of the receiver nodes which collects data. The set of ancestors of node d, denoted above as a(d) in Eqn 7, comprises {node b 206, node k 204, root node 0 202}. For a probe probe i, the probability of path passage $A_d(i)$ from root node 0 202 to receiver node d 210 is equal to the product of the probability of link passage across link k 218×the probability of link passage across link b 220×the probability of link passage across link d 222. A similar analysis holds for the other receiver nodes, node e 212-node g 216. A goal of MINC is to use the data collected at receiver nodes, node d 210-node g 216, to estimate the link passage probabilities across individual links, link k 218-link g 230. In a more generalized example, a goal is to estimate the link pattern passage probability $\alpha_l(I)$ of arbitrary patterns for all internal links l. These can be extracted from Eqn. 6 if $A_l(I)$ is known for all l, l≠0. In general, solving a polynomial equation of order >1 is required.

Figure 5:
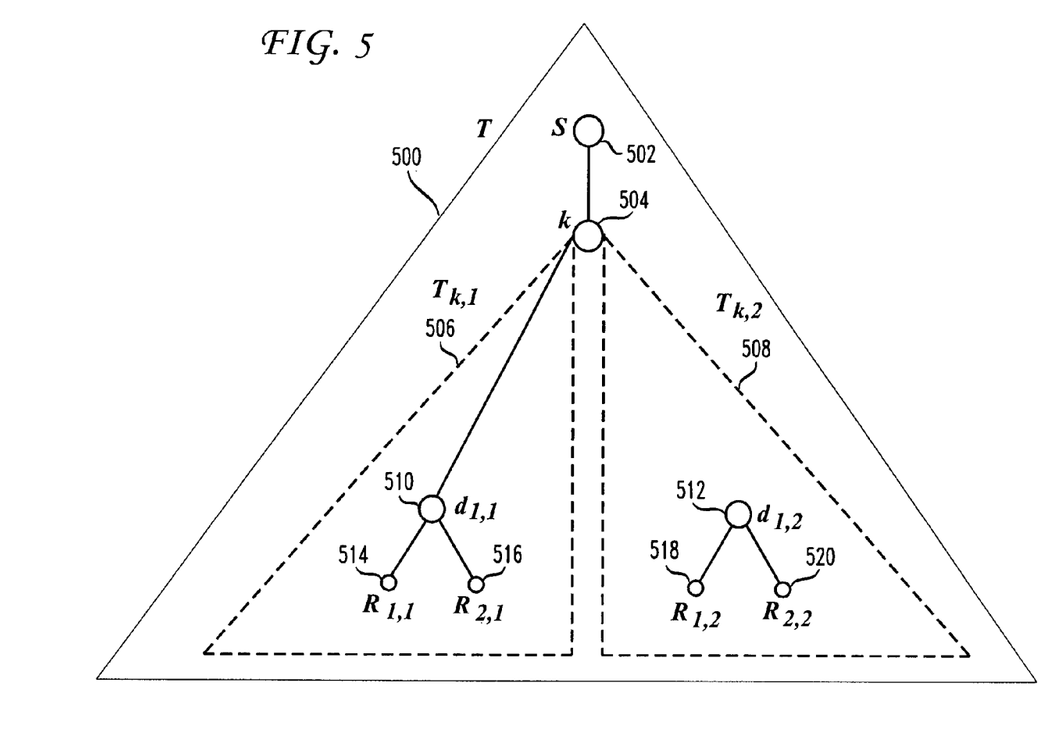
FIG. 5 is a schematic for subtree partitioning of a binary tree.

In an embodiment, path passage probabilities are calculated as a function of link passage probabilities by a process of subtree partitioning, which results in lower order polynomial equations. Since, in general, lower order polynomial equations are easier to solve than higher order polynomial equations, subtree partitioning is advantageous. For example, subtree partitioning may result in a linear equation instead of a quadratic equation. The underlying concept of subtree partitioning is illustrated for a binary tree in the example shown in FIG. 5. In the binary tree T 500, each branch node has two child nodes. Here, probes are multicast from a source node S 502 to branch node node k 504. Tree T 500 is partitioned into two subtrees, subtree $T_{k,1}$ 506 and subtree $T_{k,2}$ 508. Branch node node k 504 in tree T 500 is configured as the root node for each of the two subtrees, $T_{k,1}$ 506 and $T_{k,2}$ 508. Node k 504 has two child nodes, node $d_{1,1}$ 510 and node $d_{1,2}$ 512. Each child node has two child nodes of its own. Node $d_{1,1}$ 510 is a branch node in subtree $T_{k,1}$ 506, and node $d_{1,2}$ 512 is a branch node in subtree $T_{k,2}$ 508. In turn, branch node node $d_{1,1}$ 510 has two child nodes, node $R_{1,1}$ 514 and node $R_{2,1}$ 516. Similarly, branch node node $d_{1,2}$ 512 has two child nodes, node $R_{1,2}$ 518 and node $R_{2,2}$ 520. Here, node $R_{1,1}$ 514, node $R_{2,1}$ 516, node $R_{1,2}$ 518 and node $R_{2,2}$ 520 are receiver nodes which receive probes from source node S 502.

In an example for a binary tree with subtree partitioning, path passage probabilities are calculated as follows. The following parameters and functions are defined herein.

$$Y_{k,c}(i) = \bigvee_{j \in R_{k,c}} X_j(i), \text{ for } c = \{1, 2\}, \quad \text{(Eqn 8)}$$

where $c = 1$ is subtree 1, $c=2$ is subtree 2. Here, V denotes bitwise OR. $Y_{k,c}(i)$ is a random variable.

For $c=0$, where $c=0$ refers to the unpartitioned tree, $$Y_{k,0}(I) = Y_{k,1}(i) V Y_{k,2}(i) \quad \text{(Eqn 9)}$$

Here $Y_{k,1}(i)=1$ if there exists a receiver in $R_{k,1}$ which receives the i-th probe (else 0). Similarly, $Y_{k,2}(i)=1$ if there exists a receiver in $R_{k,2}$ which receives the i-th probe (else 0). $Y_{k,0}(I)=1$ if at least one of $\{R_{k,1}, R_{k,2}\}$ contains such a receiver (else 0).

$$\gamma_{k,c}(i) = Pr[Y_{k,c}(i)=1], \text{ for } c \in \{0, 1, 2\} \quad \text{(Eqn 10)}$$

Then, the values $A_k(i)$ of may be calculated as:

$$A_k(i) = Pr[X_k(i)] = \gamma_{k,0}(i), \text{ for } k \in R, \quad \text{(Eqn 11)}$$

where R is the set of receiver nodes.

Let U be the set of non-root nodes, then U\R is the set of branch nodes (non-root, non-receiver). For $k \in U \backslash R$, the following value is defined:

$$\beta_{k,c}(i) = Pr[Y_{k,c}(i) = 1 \mid X_k(i)] = \frac{\gamma_{k,c}(i)}{\mathcal{A}_k(i)} \quad \text{(Eqn 12)}$$

Then, $$\gamma_{k,0}(i) = A_k(i)\beta_{k,0}(i) \quad \text{(Eqn 13)}$$

$$\gamma_{k,0}(i) = A_k(i)\{1-(1-\gamma_{k,1}(i)/A_k(i))(1-\gamma_{k,2}(i)/A_k(i))\} \quad \text{(Eqn 14)}$$

Eqn 14 is linear in $A_k(i)$ and can be solved:

$$\mathcal{A}_k(i) = \frac{\gamma_{k,1}(i)\gamma_{k,2}(i)}{\gamma_{k,1}(i) + \gamma_{k,2}(i) - \gamma_{k,0}(i)} \quad \text{(Eqn 15)}$$

Summarizing Eqn 11 and Eqn 15:

$$\mathcal{A}_k(i) = \gamma_{k,0}(i), \text{ for } k \in R \quad \text{(Eqn 16)}$$

$$\mathcal{A}_k(i) = \frac{\gamma_{k,1}(i)\gamma_{k,2}(i)}{\gamma_{k,1}(i) + \gamma_{k,2}(i) - \gamma_{k,0}(i)}, \text{ for } k \in U/R$$

Figure 6:
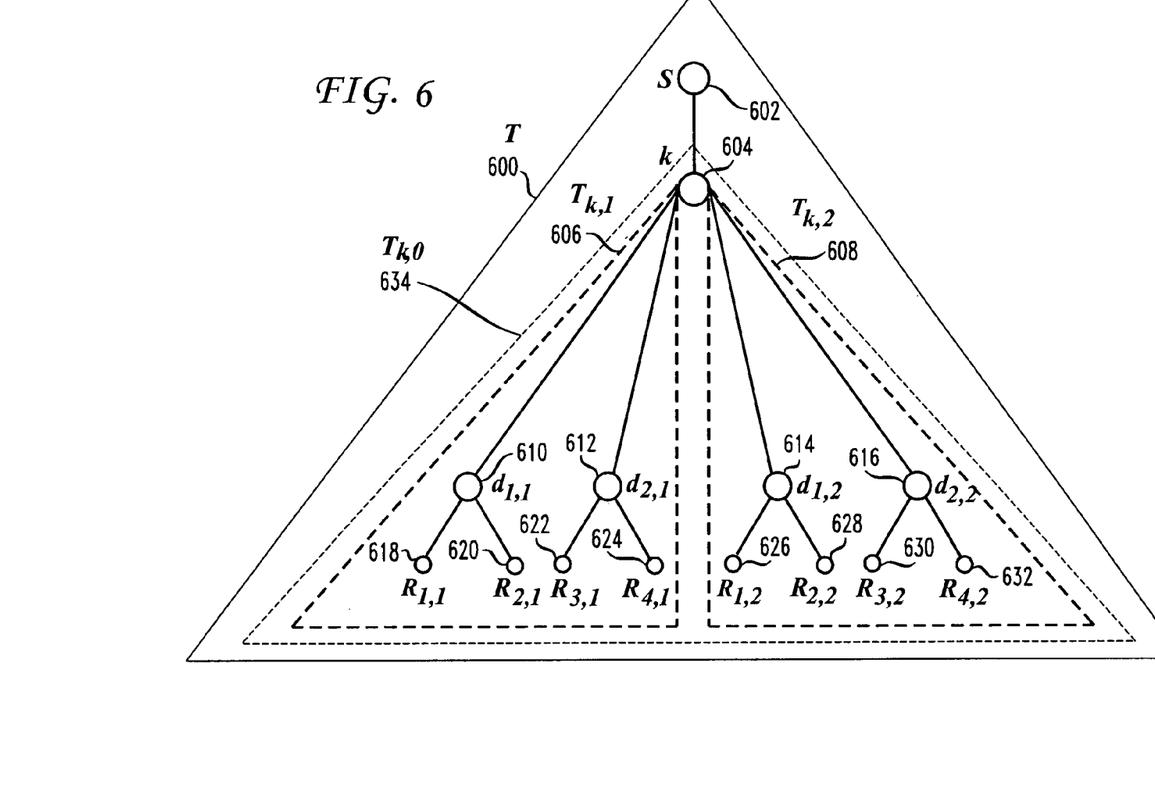
FIG. 6 is a schematic for subtree partitioning of an arbitrary tree.

If the network comprises an arbitrary tree, in which a branch node may have more than two child nodes, the corresponding equation for $A_k(i)$ is a polynomial equation of order $|d_k|-1$, where $|d_k|$ is the number of children of node k. In an example, the order of the equation may be reduced (for example, from quadratic to linear) by a more generalized subtree partitioning procedure. An example is shown in FIG. 6, which shows a schematic of an arbitrary tree T 600. As in the binary tree model above, probes are multicast from a source node S 602 to branch node node k 604. In this instance, branch node node k 604 has four child nodes, 610-616. In the subtree partitioning procedure, branch node node k 604 is configured as the root node for two subtrees, denoted $T_{k,1}$ 606 and $T_{k,2}$ 608. The union of $T_{k,1}$ 606 and $T_{k,2}$ 608 is denoted $T_{k,0}$ 634, which is the entire subtree under node k 604. Each of the four child nodes 610-616 is then allocated to one of the subtrees. In general, child nodes are allocated to subtrees such that the population of child nodes in each subtree is approximately equal. In some instances, depending on the tree structure, an exactly equal number of child nodes in each subtree may not be achievable (for example, if there are an odd number of child nodes). Herein, "approximately equal" means that the number of child nodes in each subtree are as close to equal as the tree architecture permits in a specific instance. In this instance, child nodes 610 and 612 are allocated to subtree $T_{k,1}$ 606, and child nodes 614 and 616 are allocated to subtree $T_{k,2}$ 608. The child nodes are then indexed as node $d_{1,1}$ 610, node $d_{2,1}$ 612, node $d_{1,2}$ 610, and node $d_{1,2}$ 614. These child nodes then serve as branch nodes for leaf nodes. The leaf nodes in subtree $T_{k,1}$ 606 are node $R_{1,1}$ 618, node $R_{2,1}$ 620, node $R_{3,1}$ 622, and node $R_{4,1}$ 624. Similarly, the leaf nodes in subtree $T_{k,2}$ 608 are node $R_{1,2}$ 626, node $R_{2,2}$ 628, node $R_{3,2}$ 630, and node $R_{4,2}$ 632. The linear solutions for $A_k(i)$ shown in Eqn 15 hold for arbitrary trees.

As discussed above, Eqn 15 apply for a single probe i. Another parameter of interest is the joint probability of a probe pattern I. In an example in which subtree partitioning is used, this parameter is calculated as follows.

$$Y_{k,c}(I) = \bigwedge_{h \in I} Y_{k,c}(h), \text{ for the two subtrees } c = \{1, 2\} \quad \text{(Eqn 17)}$$

Here $\Lambda$ denotes bitwise AND.

$$Y_{k,0}(I) = Y_{k,1}(I) V Y_{k,2}(I), \text{ where } c=0 \quad \text{(Eqn 18)}$$

refers to the unpartitioned tree.

Then, corresponding to Eqn 16 for the single probe i, $$\mathcal{A}_k(I) = \gamma_{k,0}(I), \text{ for } k \in R \quad \text{(Eqn 19)}$$

$$\mathcal{A}_k(I) = \frac{\gamma_{k,1}(I)\gamma_{k,2}(I)}{\gamma_{k,1}(I) + \gamma_{k,2}(I) - \gamma_{k,0}(I)},$$

for $k \in U/R$

If subtree partitioning is not used, then the values corresponding to Eqn. 12 are $$\beta_{k,c}(I) = \gamma_{k,c}(I)/A_k(I), \text{ for } c \in \{0, 1, \ldots (|d_k|-1)\} \quad \text{(Eqn 20)}$$

$$\beta_{k,0}(I) = 1 - \prod_{c=1}^{|d_k|-1} (1 - \beta_{k,c}(I)) \quad \text{(Eqn 21)}$$

The resulting equation for $A_k(I)$ is not linear, but a polynomial of order $|d_k|-1$. Subtree partitioning is advantageous because Eqn 19 is linear.

In the subtree partitioning schemes described above, all probes in I passed through node k and reached receivers via nodes all within a single subtree. These schemes do not capture cases in which probes reach receivers for each index in I in a distributed way across the two subtrees, $T_{k,1}$ and $T_{k,2}$. In a further example of subtree partitioning, this limitation is removed, and $A_k(I)$ may be derived from all trials which imply $X_k(I)$.

In one example, for $I=\{i, i+1\}$, and $l, m, n, o \in \{0,1\}$:

$$A_k[l] = Pr[X_k(i)=l] \tag{Eqn 22}$$

$$A_k[lm] = Pr[X_k(i)=l, X_k(i)=(i+1)=m] \tag{Eqn 23}$$

$$Y_{k,c}(i) = \bigvee_{j \in R_{k,c}} X_j(i) \tag{Eqn 24}$$

$$\gamma_{k,c}(l) = Pr[Y_{k,c}=l], \text{ for } c=\{1,2\} \tag{Eqn 25}$$

$$\gamma_{k,c}[lm] = Pr[Y_{k,c}(i)=l, Y_{k,c}(i+1)=m], \text{ for } c=\{1,2\} \tag{Eqn 26}$$

$$\gamma_k[lm, no] = Pr[Y_{k,1}(i)=l, Y_{k,1}(i+1)=m, \tag{Eqn 27}$$

$$Y_{k,2}(i)=n, Y_{k,2}(i+1)=o]$$

$$\beta_{k,c}(l) = Pr[Y_{k,c}(i)=l|X(i)], \text{ for } c=\{1,2\} \tag{Eqn 28}$$

$$\beta_{k,c}(lm) = Pr[Y_{k,c}(i)=l, Y_{k,c}(i+1)=m|X(i)], \text{ for } c=\{1,2\} \tag{Eqn 29}$$

$$\gamma_k[11] = Pr[Y_k(i)=l, Y_k(i+1)=1] \tag{Eqn 30}$$

Then trials which imply $x_k(I)$ are $$\gamma_k[11] = \gamma_k[10,01] + \gamma_k[01,10] + \gamma_{k,1}[11] + \tag{Eqn 31}$$

$$\gamma_{k,2}[11] - \gamma_k[11,11]$$

where $\gamma_k[10,01]$ and $\gamma_k[01,10]$ capture those missed by $Y_{k,0}$. From the conditional independence of the two trees, $$\gamma_k[11] - \gamma_{k,1}[11] - \gamma_{k,2}[11] = \tag{Eqn 32}$$
$$\gamma_k[10, 01] - \gamma_k[01, 10] - \gamma_k[11, 11] = \mathcal{A}_k[11]$$
$$(\beta_{k,1}[10]\beta_{k,2}[01] + \beta_{k,1}[01]\beta_{k,2}[10] + \beta_{k,1}[11]\beta_{k,2}[11])$$

As before, $$\gamma_{k,c}[11] = A_k[11]\beta_{k,1}[11], \text{ for } c=\{1,2\} \tag{Eqn 33}$$

therefore, $$\gamma_{k,c}[lm] = A_k[11]\beta_{k,c}[lm] + (A_k[1] - A_k[11])\gamma_{k,c}[1]/A_k[1] \tag{Eqn 34}$$

for $[lm]=[01]$ or $[10]$ and $c=\{1, 2\}$

The $\beta_{k,c}(lm)$ can now be eliminated in Eqn 34 and the resulting quadratic equation for $A_k[11]$ may be solved.

For the above tree and subtree partitioning schemes, estimators for parameters of interest may be derived. From n trials, samples of variables $Y_{k,c}(I)$ are collected for each I of interest. Values of $\gamma_{k,c}(I)$ may then be estimated using the empirical frequencies:

$$\hat{\gamma}_{k,c}(I) = \frac{\sum_{i=0}^{n-s-1} Y_{k,c}(i+I)}{n-s-1} \tag{Eqn 35}$$

where $s = |I|$

The values of $\hat{\gamma}_{k,c}(I)$ are then used to define an estimator $\hat{A}_k(I)$ for $A_k(i)$. In the case of subtree partitioning, this is done by substituting into the relevant equation for $A_k(i)$. Otherwise, the unique root in $[0,1]$ of the polynomial is found numerically. Another parameter of interest, the link joint passage probabilities, is estimated by $$\hat{a}_k(I) = \frac{\hat{\mathcal{A}}_k(I)}{\hat{\mathcal{A}}_{f(k)}(I)} \tag{Eqn 36}$$

The analysis above yields three categories of estimators, all of which work on arbitrary trees and arbitrary probe patterns I. These categories are defined herein. "General", based on Eqn 21, applies to instances in which there is no subtree partitioning, and in which $A_k(i)$ is solved numerically if the tree is non-binary. "Subtree", based on Eqn 19, applies to instances in which there is subtree partitioning. "Advanced subtree", based on Eqn 32, yields a quadratic in $A_k(I)$ when using subtree partitioning.

In another embodiment, the parameter of interest is delay. In the examples discussed above, in which the parameter of interest was loss, the multicast process was characterized by node states and link processes. The node state $X_l(i)$ indicated whether probe i had arrived at node l. There were only two values of node states. $X_l(i)=1$ if probe i arrives at node l; else 0. The link process $Z_l(i)$ indicated whether link l was capable of transmission during the interval in which probe i would have attempted to reach node l, assuming that probe i had been present at the father node f(l). The link process $Z_l(i)$ also had only two values. $Z_l(i)=1$ if link l is capable of transmission for probe i; else 0.

For delay, the multicast process is characterized by two processes. The delay measurement process $X_l(i)$ records the delay along link l. The delay is the difference between the time at which probe i is transmitted from the father node f(l) of node l (assuming probe i has reached f(l)) and the time at which it is received by node l. The link process $Z_l(i)$ is the time delay process which determines the delay encountered by probe i during its transmission from f(l) to node l. In an embodiment, a series of probes, probe i, is transmitted from source node root node 0 to a receiver node node R. At receiver node node R, the total end-to-end path delay from source node root node 0 to node R is recorded. The aggregate data collected from a set of receiver nodes {node R} characterizes the set of end-to-end paths from source node root node 0 to each receiver node. MINC uses the aggregate data to infer temporal characteristics of delay processes determining the link processes $Z_l = \{Z_l(i)\}$ along individual links internal to the network. Examples of link delay processes include Bernoulli Scheme, Stationary Ergodic Semi-Markov Process, and Stationary Ergodic Semi-Markov Process of Order r.

In general, delay values are continuous values from 0 to $\infty$, (the value $\infty$ may be used to characterize a lost probe). In an embodiment, link delay values are measured as discrete values, which are an integer number of bins with a bin width of q. The set of delay values is then $$D=\{0, q, 2q, \ldots, mq, \infty\}, \tag{Eqn 37}$$

where mq is a user-definable threshold value. Delays greater than mq are declared to be lost, and the delays are set to $\infty$.

If q is normalized to 1 then the following set is defined:

$$D=\{0, 1, 2, \ldots, m, \infty\} \tag{Eqn 38}$$

The discrete time discrete state delay process at link k is then $\{Z_k(i)\}$ and $Z_k(i) \in D$.

The delay measurement process at a node k is denoted $$\{X_k(i)\}: X_k(i) \in \{0, 1, 2, \ldots, ml(k), \infty\}, \tag{Eqn 39}$$

where l(k) is the genealogical level with respect to root of node k, $f^{l(k)}$=root.

For probe i, then, $$X_k(i) = Z_k(i) + X_{f(k)}(i) \qquad \text{(Eqn 40)}$$

which states that the delay between root and node k is equal to the delay between root and f(k) and the incremental delay between f(k) and node k. The total delay from root to node k is then the sum of the delay processes over all the ancestor nodes of node k:

$$X_k(i) = \sum_{j \in a(k)} Z_j(i), \qquad \text{(Eqn 41)}$$

where a(k) is the set of ancestor nodes of node k.

In addition, the following probability results:

$$Pr[X_k(i) = p \mid X_{f(k)}(i) = q] = \qquad \text{(Eqn 42)}$$
$$\begin{cases} 0 & \text{for } p < q, \\ 1 & \text{for } p = q = \infty, \\ Pr[Z_k(i) = p - q] & \text{otherwise.} \end{cases}$$

which states that if the delay from root to f(k) is the value q, then the probability that the delay from [root to node k]=p has three outcomes. If p<q, then the probability is obviously 0, otherwise the delay between f(k) and node k is negative (probe i arrives at node k before it arrives at f(k)). If q=∞, then the probability that p=∞ is obviously 1 since if probe i is lost at f(k) it continues to be lost at node k (probe i is not regenerated between f(k) and node k). Otherwise, the probability is the probability that the link delay process $Z_k(i)$ has the value (p−q).

As in the example described above for a loss process, an embodiment for a delay process is applied to instances with the following dependence structure:

Spatial. Packet delay is independent across links.

Temporal. In previous applications of MINC, a delay process within a single link is independent of time. In advantageous procedures described herein, this constraint is removed, and a larger range of network characteristics may be analyzed. A delay process on any link is stationary and ergodic. That is, within a link, delays may be correlated, with parameters that in general depend on the link.

Packet delay on a specific network link is equal to the sum of a fixed delay and a variable delay. The fixed delay, for example, may be the minimum delay resulting from processing by network equipment (such as routers and switches) and transmission across physical links (such as fiber or metal cable). The minimum delay is characteristic of networks in which the traffic is low. As traffic increases, a variable delay is introduced. The variable delay, for example, may result from queues in buffers of routers and switches. It may also arise from re-routing of traffic during heavy congestion. In one procedure, delay is normalized by subtracting the fixed delay from the total delay. For example, for a specific link to a specific receiver, the fixed delay may be set equal to the minimum delay measured over a large number of samples at low traffic. If $d_{max}$ is the maximum normalized delay measured over the set of receivers, then the threshold m for declaring a packet as lost, may for example, be set to $$m = d_{max}/q, \text{ where } q \text{ is the bin width.} \qquad \text{(Eqn 43)}$$

A general goal is to estimate the complete family of joint probabilities $$Pr[Z_k(i_1) = d_1, Z_k(i_2) = d_2, \ldots, Z_k(i_s) = d_s] \qquad \text{(Eqn 44)}$$

for any set $s \geq 1$ probe indices $I = \{i_1, i_2, \ldots i_s\}$ and $d_1, d_2, \ldots d_s \in D$ Principal values of interest are run distributions and mean run lengths. Let $L_k^H$ denote a random variable which indicates the length of runs of $Z_k$ in a subset H, in which H satisfies a set of user-defined parameters, of full state space D. Examples of H are given below. Then, the probability that $L_k^H$ is greater than or equal to a value j is $$Pr[L_k^H \geq j] = \frac{Pr[Z_k(j) \in H, \ldots, Z_k(1) \in H] - Pr[Z_k(j) \in H, \ldots, Z_k(0) \in H]}{Pr[Z_k(1) \in H] - Pr[Z_k(0) \in H, Z_k(1) \in H]} \qquad \text{(Eqn 45)}$$

The mean run length is $$\mu_k^H = E[L_k^H] = \frac{Pr[Z_k(j) \in H]}{Pr[Z_k(1) \in H] - Pr[Z_k(0) \in H, Z_k(1) \in H]} \qquad \text{(Eqn 46)}$$

In Eqn 46, $\mu_k^H$ is the ratio of the expected proportion of time spent in runs in the subset H (per unit time index) divided by the expected number of transitions into H (per unit time index). The mean run length of a delay state may be derived if the simplest joint probabilities with respect to that state may be estimated:

for a single probe, $Pr[Z_k(i) \in H]$, for a successive pair of probes, $Pr[Z_k(i) \in H, Z_k(i+1) \in H]$.

The tail probabilities of runs in H, $$Pr[L_k^H \geq j]$$

can be obtained from the joint probabilities of the state H for one, two, j, and j+1 probes.

Eqn 45 may be used to partition the link states into two classes. States in subset H are referred to as "bad". States in D\H are referred to as "good". For example, H may refer to states with a delay greater than a user-defined value d. In which case, $\mu_k^H$ is the mean duration of runs in which the delay is at least d.

As in the procedure for estimating temporal loss characteristics, in an embodiment for estimating temporal delay characteristics, the source at the root node multicasts a stream of n probes, and each receiver records the end-to-end delays. The transmission of probes may then be viewed as an experiment with n trials. The outcome of the i-th trial is the set of discretized source-to-receiver delays $$\{X_k(i), k \in R\}, X_k(i) \in \{0, 1, \ldots, ml(k), \infty\} \qquad \text{(Eqn 47)}$$

To calculate joint probabilities, the following values are defined herein.

$I = \{i_1, i_2, \ldots i_s\}$, as before I is a set of probe indexes, (Eqn 48) not necessarily contiguous $X_k(I) = [X_k(i_1), X_k(i_2), \ldots, X_k(i_s)]$ is a random vector (Eqn 49)

$Z_k(I) = [Z_k(i_1), Z_k(i_2), \ldots, Z_k(i_s)]$ is a random vector (Eqn 50)

D, V are delay vectors, and $D \leq V$ means $d_j \leq v_j$ for any j (Eqn 51)

$$M = [m, m, \ldots, m] \quad \text{(Eqn 52)}$$

$$O = [0, 0, \ldots, 0] \quad \text{(Eqn 53)}$$

Then, the joint link probability is $$\alpha_k(I, D) = Pr[Z_k(I) = D], \text{ for } D, V \geq O, \quad \text{(Eqn 54)}$$

and the joint passage probability is $$\mathcal{A}_k(I, \mathbb{D}) = Pr[\mathbb{X}_k(I) = \mathbb{D}] \text{ for } \mathbb{O} \leq \mathbb{D}, \mathbb{V} \leq \mathbb{M} \quad \text{(Eqn 55)}$$

$$= \sum_{\mathbb{O} \leq \mathbb{V} \leq \mathbb{D}} \alpha_k(I, \mathbb{V}) \mathcal{A}_{f(k)}(\mathbb{D} - \mathbb{V})$$

After the values $A_k(I, D)$, for all $k \in U$, for $O \leq D \leq M$, have been obtained, the following values are recursively deconvolved:

For $\mathbb{D} = \mathbb{O}$, $$\alpha_k(I, \mathbb{O}) = \frac{\mathcal{A}_k(I, \mathbb{O})}{\mathcal{A}_{f(k)}(I, \mathbb{O})} \quad \text{(Eqn 56)}$$

For $\mathbb{O} < \mathbb{D} \leq \mathbb{M}$, $$\alpha_k(I, \mathbb{D}) = \frac{\mathcal{A}_k(I, \mathbb{D}) - \sum_{\mathbb{O} < \mathbb{V} \leq \mathbb{D}} \mathcal{A}_{f(k)}(I, \mathbb{V}) \alpha_k(I, \mathbb{D} - \mathbb{V})}{\mathcal{A}_{f(k)}(I, \mathbb{O})} \quad \text{(Eqn 57)}$$

For the case where $D \leq M$ does not hold (that is, at least one element of D is ∞), $\alpha_k(I, D)$ is obtained using $\alpha_k(I, V), V \leq M$, recursively using the $\alpha_k$ for smaller index sets. For example, for $D = [d_1 = \infty, d_2, \ldots, d_s]$, then $\alpha_k(I, D)$ may be re-expressed as follows:

$$\alpha_k(I, \mathbb{D}) = \alpha_k(\{i_2, \ldots, i_s\}, [d_2, \ldots, d_s]) - \sum_{v_1 \leq m} \alpha_k(I, [v_1, d_2, \ldots d_s]) \quad \text{(Eqn 58)}$$

For $k \in U$, path probabilities $A_k(I, D)$, $O \leq D \leq M$, are estimated by using the principle of subtree partition as follows. Consider branch node k 604 in the tree T 600 (FIG. 6). It is the root of the subtree $T_{k,0}$ 634, which has receiver nodes $R_{k,0}$ where $R_{k,0}$ is the combined set of receiver nodes $R_{1,1}$ 618 to $R_{4,1}$ 624 and $R_{1,2}$ 626 to $R_{4,2}$ 632. The set of child subtrees of node k 604 are divided into two sets, corresponding to two virtual subtrees $T_{k,1}$ 606 and $T_{k,2}$ 608. Let $j = \{0, 1, 2\}$ be used to index quantities corresponding to subtrees $T_{k,0}$ 634, $T_{k,1}$ 606, and $T_{k,2}$ 608, respectively. For a set of probe indices I, the following random vectors and probabilities are defined:

$$Y_{k,j}(i) = \min_{r \in R_{k,j}} X_r(i), \mathbb{Y}_{k,j}(I) = [Y_{k,j}(i_1), \ldots, Y_{k,j}(i_s)] \quad \text{(Eqn 59)}$$

$$\tilde{Y}_{k,j}(i, d) = \begin{cases} 1 & \text{if } Y_{k,j}(i) - X_k(i) \leq d \\ 0 & \text{if } Y_{k,j}(i) - X_k(i) > d \end{cases}$$

$$\tilde{\mathbb{Y}}_{k,j}(I, D) = [\tilde{Y}_{k,j}(i_1, d_1), \ldots, \tilde{Y}_{k,j}(i_s, d_s)] \quad \text{(Eqn 60)}$$

$$\gamma_{k,j}(I, D) = Pr[\mathbb{Y}_{k,j}(I) \leq D] \quad$$

$$\beta_{k,j}(I, D, B) = Pr[\tilde{\mathbb{Y}}_{k,j}(I, D) = B] \quad \text{(Eqn 61)}$$

where $B \in \{0, 1\}^{|I|}$. $\gamma_{k,j}(I, D)$ is the probability that for each probe index $i_l \in I$, the minimum delay on any path from source S to receivers in $R_{k,j}$, does not exceed $d_l \in D$. On the other hand, $\beta_{k,j}(I, D, B)$ is the probability that, for each probe index $i_l \in I$, the minimum delay on any path from node k 604 to receivers in $R_{k,j}$ is either $\leq d_l$ or $> d_l \in D$, depending on whether $b_l \in B$ is 1 or 0. Let $1 = [1, \ldots, 1]$. Then, A, β, and γ are related by the following convolution:

$$\gamma_{k,j}(I, \mathbb{D}) = \sum_{\mathbb{O} \leq \mathbb{V} \leq \mathbb{D}} \mathcal{A}_k(I, \mathbb{V}) \beta_{k,j}(I, \mathbb{D} - \mathbb{V}, \mathbf{1}) \quad \text{(Eqn 62)}$$

In order to recover $A_k(I, D)$'s from the $\gamma_k(I, D)$'s which are directly observable from receiver data, the following two properties of β's are used.

Property 1. This property gives the relationship between $\beta_{k,0}$ and $\{\beta_{k,1}, \beta_{k,2}\}$ of the virtual subtrees.

$$\beta_{k,0}(I, \mathbb{D}, \mathbf{1}) = 1 - \prod_{j=1}^{2} \left( 1 - (1 - \beta_{k,j}(I, \mathbb{D}, \mathbf{1})) + \right. \quad \text{(Eqn 63)}$$

$$\left. 1_{|I|>1} \left( \sum_{\substack{\mathbb{B}_1 \neq \mathbf{1}, \mathbb{B}_2 \neq \mathbf{1} \\ s.t. \mathbb{B}_1 \vee \mathbb{B}_2 = \mathbf{1}}} \prod_{j=1}^{2} \beta_{k,j}(I, \mathbb{D}, \mathbb{B}_j) \right) \right)$$

Property 2. (Recursion over index sets with B=1) This property allows $\beta_{k,j}(I, D, B \neq 1)$ to be expressed in terms of $\beta_{k,j}(I', D', 1)$'s, where $I' \subset I$. For instance, if $B = [b_1 = 0, b_2, \ldots, b_s]$, and $I' = \{i_2, \ldots, i_s\}$, $B' = [b_2, \ldots, b_s]$, $D' = [d_2, \ldots, d_s]$, then $$\beta_{k,j}(I, D, B) = \beta_{k,j}(I', D', B') - \beta_{k,j}(I, D, [1, b_2, \ldots, b_s])$$

which eliminates the 0 at $i_1$. The above can be applied recursively to eliminate all zeroes, resulting in terms of the form $\beta_{k,j}(I', D', 1)$, $I' \subset I$, $|I| - z(B) \leq |I'| \leq |I|$, where $z(B)$ denotes the number of zeroes in B. In general $$\beta_{k,j}(I, D, B \neq 1) = (-1)^{z(B)} \beta_{k,j}(I, D, 1) + \delta_{k,j}(I, D, B) \quad \text{(Eqn 64)}$$

where $\delta_{k,j}(I, D, B)$ is the appropriate summation of $\beta_{k,j}$'s for index sets $I' \subset I$. For example, if $I = \{1, 2\}$, $B = [0, 1]$, $D = [d_1, d_2]$, then, $$\beta_{k,j}(I, D, B) = -\beta_{k,j}(I, D, 1) + \beta_{k,j}(\{2\}, [d_2], 1)$$

Hence, $\delta_{k,j}(I, D, B) = \beta_{k,j}(\{2\}, [d_2], 1)$.

By using Equation 64 in Equation 63, terms of the type $B_j \neq 1$ can be removed, leaving only terms of type $B_j = 1$, giving:

$$\beta_{k,0}(I, \mathbb{D}, \mathbf{1}) = 1 - \prod_{j=1}^{2} (1 - \beta_{k,j}(I, \mathbb{D}, \mathbf{1})) + \quad \text{(Eqn 65)}$$

$$1_{|I|>1} \left( \sum_{\substack{\mathbb{B}_1 \neq \mathbf{1}, \mathbb{B}_2 \neq \mathbf{1} \\ s.t. \mathbb{B}_1 \vee \mathbb{B}_2 = \mathbf{1}}} \prod_{j=1}^{2} \{(-1)^{z(B)} \beta_{k,j}(I, \mathbb{D}, \mathbf{1}) + \right.$$

$$\delta_{k,j}(I, \mathbb{ID}, \mathbb{B})\}$$

Using Equation 65 and Equation 62, the desired path probabilities for node k 604, $A_k(I, D)$, $O \leq D \leq M$, can be computed using the observables $\gamma_{k,j}(I, D)$. The recovery of $A_k(I, D)$ from the above equations involves two levels of recursion: (i) over delay vectors, arising due to convolution, (ii) over index sets arising due to summation term involving $\delta$ in Equation 65. The $\delta(I, ., .)$ only contains terms involving $I' \subset I$ and therefore does not contain $A_k(I, .)$. Thus estimation can be performed recursively starting from $I=\{i\}$ when the summation term with $\delta$ vanishes and $D=O$ when the convolution vanishes. Each step of recursion involves solving a quadratic equation in the unknown $A_k$.

The computation of $A_k(I, D)$ for pairs of consecutive probes i.e. $I=\{1, 2\}$, proceeds as follows ($I=\{1, 2\}$ is same as $I=\{i, i+1\}$). Due to recursion over index sets, the case of $I=\{1\}$ is considered first.

Single probes $I=\{1\}$: The base case of recursion occurs for $I=\{i\}$ and $D=[0]$. To simplify notation, the following are dropped: the index set I, B=1, and vector notation for delays. For example, $\beta_{k,j}(I, [d_1], 1) = \beta_{k,j}(d_1)$. Writing out Equation 65 and Equation 62, $$\gamma_{k,j}(0) = A_k(0)\beta_{k,j}(0)$$

$$\beta_{k,0}(0) = 1 - (1 - \beta_{k,1}(0))(1 - \beta_{k,2}(0)) \quad \text{(Eqn 66)}$$

from which $A_k(0)$ is recovered by solving a linear equation as $$\mathcal{A}_k(0) = \frac{\gamma_{k,1}(0)\gamma_{k,2}(0)}{\gamma_{k,1}(0) + \gamma_{k,2}(0) - \gamma_{k,0}(0)}$$

Substituting back $A_k(0)$ gives the $\beta_{h,j}(0)$'s for use in the next step. Assuming that $A_k$ and $\beta_{k,j}$'s have been computed $\forall v_1 < d_l$, $A_k(d_1)$ is recovered using Equation 65 and Equation 62 as $$\gamma_{k,j}(d_1) =$$
$$\mathcal{A}_k(0)\beta_{k,j}(d_1) + \mathcal{A}_k(d_1)\beta_{k,j}(0) + \sum_{0 < v_1 < d_1} \mathcal{A}_k(v_1)\beta_{k,j}(d_1 - v_1)$$
$$* \qquad * \qquad *$$

$$\beta_{k,0}(d_1) = 1 - (1 - \beta_{k,1}(d_1))(1 - \beta_{k,2}(d_1))$$
$$* \qquad * \qquad *$$

The unknown terms are marked by a "*". $A_k(d_1)$ is recovered by solving a quadratic equation and substituting back $A_k(d_1)$ gives $\beta_{k,j}(d_1)$'s.

Pairs of consecutive probes $I=\{1, 2\}$: Again, to simplify the notation, the following are dropped: the index set I, B=1, and vector notation for delays. For example, $\beta_{k,j}(I, Id_1, d_2], 1) = \beta_{k,j}(d_1, d_2)$. The estimation proceeds from delay vector $[0, 0]$ until $[m, m]$. Assuming that $A_k$ and $\beta_j$'s have been computed for the set $$\{[v_1, v_2]: v_1 \leq d_1, v_2 \leq d_2\} \setminus \{[d_1, d_2]\},$$

$A_k(d_1, d_2)$ is recovered as follows. Equation 65 and Equation 62 are expanded.

$$\gamma_{k,j}(d_1, d_2) = \mathcal{A}_k(0, 0)\beta_{k,j}(d_1, d_2) + \mathcal{A}_k(d_1, d_2)\beta_{k,j}(0, 0) + \quad \text{(Eqn 67)}$$
$$* \qquad *$$
$$\sum_{\substack{v_1 \leq d_1 \\ (v_1, v_2) \neq (0,0)}} \sum_{\substack{v_2 \leq d_2 \\ (v_1, v_2) \neq (d_1, d_2)}} \mathcal{A}_k(v_1, v_2)\beta_{k,j}(d_1 - v_1, d_2 - v_2)$$

$$\beta_{k,0}(d_1, d_2) = 1 - (1 - \beta_{k,1}(d_1, d_2))(1 - \beta_{k,2}(d_1, d_2)) +$$
$$* \qquad *$$
$$(-\beta_{k,1}(d_1, d_2) + \beta_{k,1}(d_2))(-\beta_{k,2}(d_1, d_2) + \beta_{k,2}(d_1)) +$$
$$* \qquad *$$
$$(-\beta_{k,1}(d_1, d_2) + \beta_{k,1}(d_1))(-\beta_{k,2}(d_1, d_2) + \beta_{k,2}(d_2))$$
$$* \qquad *$$

The unknown terms are marked by a "*" and $A_k(d_1, d_2)$ is obtained by solving a quadratic equation.

The parameter $\gamma_{k,j}(I, D)$ may be estimated using the empirical frequencies as:

$$\hat{\gamma}_{k,j}(I, \mathbb{ID}) = \frac{\sum_{i=0}^{n-|I|-1} \mathbf{1}_{\gamma_{k,j}(i+1) \leq \mathbb{ID}}}{n - |I| - 1} \quad \text{(Eqn 68)}$$

The parameter $\gamma_{k,j}(I, D)$ is then used to define an estimator $\hat{A}_k(I, D)$ for $A_k(I, D)$. The parameter $\hat{\alpha}_k(I, D)$ is then recursively deconvolved.

The mean run length of delay state $p \in D$ is estimated using joint probabilities of single and two packet indices as $$\hat{\mu}_k^p = \frac{\hat{\alpha}_k(p)}{\hat{\alpha}_k(p) - \hat{\alpha}_k(p, p)} \quad \text{(Eqn 69)}$$

where $\alpha_k(p) = \alpha_k(\{i_1\}, [p])$ and $\alpha_k(p, p) = \alpha_k(\{i_1, i_2\}, [p, p])$ When delay states are classified into bad H and good $G = D \setminus H$ states, the mean run length of bad state is estimated using the joint probabilities of single and two packet indices as:

$$\hat{\mu}_k^H = \frac{\sum_{p \in H} \hat{\alpha}_k(p)}{\sum_{p \in H} \hat{\alpha}_k(p) - \sum_{p_1 \in H} \sum_{p_2 \in H} \hat{\alpha}_k(p_1, p_2)} \quad \text{(Eqn 70)}$$

A similar expression is used to estimate $\hat{\mu}_k^G$.

Figure 7:
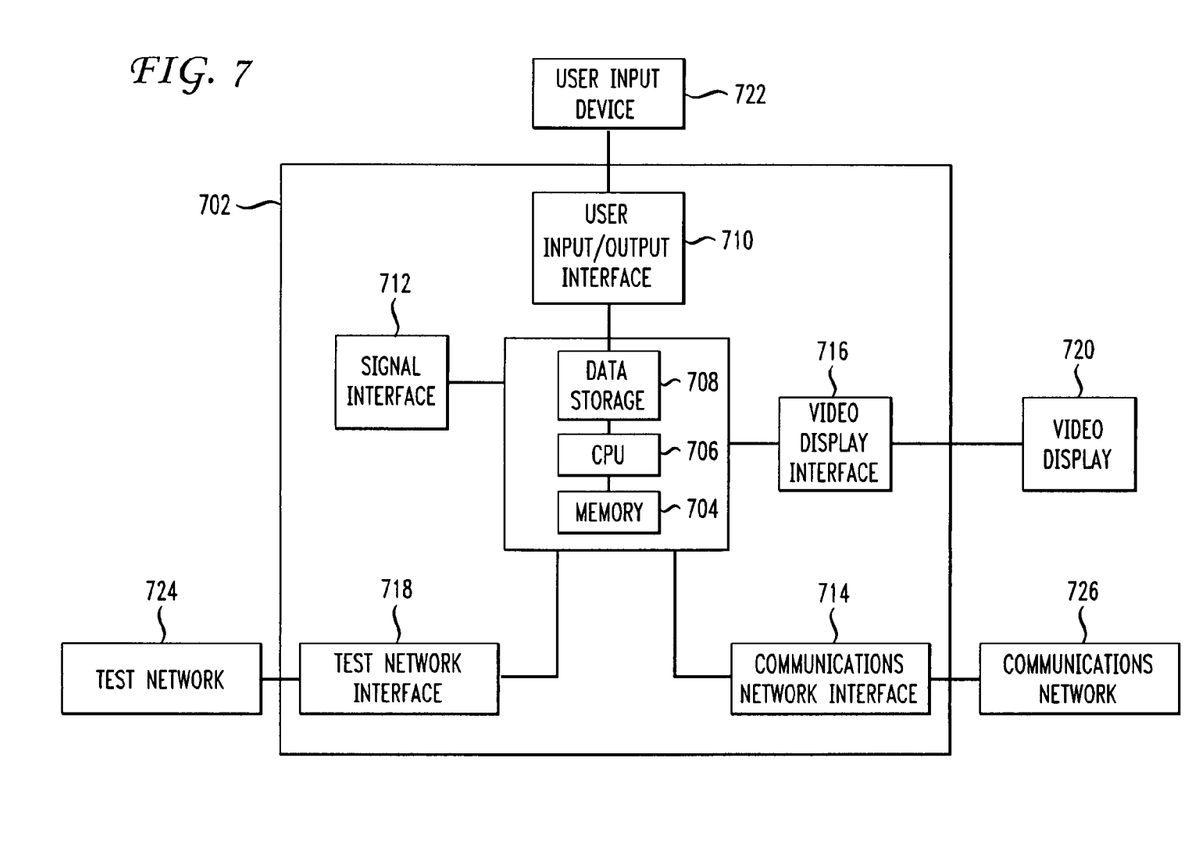
FIG. 7 is a schematic of a computer for performing a multicast-based network characterization process.

One embodiment of a network characterization system which performs multicast-based inference may be implemented using a computer. As shown in FIG. 7, computer 702 may be any type of well-known computer comprising a central processing unit (CPU) 706, memory 704, data storage 708, and user input/output interface 710. Data storage 708 may comprise a hard drive or non-volatile memory. User input/output interface 710 may comprise a connection to a user input device 722, such as a keyboard or mouse. As is well known, a computer operates under control of computer software which defines the overall operation of the computer and applications. CPU 706 controls the overall operation of the computer and applications by executing computer program instructions which define the overall operation and applications. The computer program instructions may be stored in data storage 708 and loaded into memory 704 when execution of the program instructions is desired. Computer 702 may further comprise a signal interface 712 and a video display interface 716. Signal interface 712 may transform incoming signals, such as from a network analyzer, to signals capable of being processed by CPU 706. Video display interface 716 may transform signals from CPU 706 to signals which may drive video display 720. Computer 702 may further comprise one or more network interfaces. For example, communications network interface 714 may comprise a connection to an Internet Protocol (IP) communications network 726, which may transport user traffic. In one embodiment, the network characterization system further comprises nodes within communications network 726. These nodes may serve as a source node and a set of receiver nodes. As another example, test network interface 718 may comprise a connection to an IP test network 724, which may transport dedicated test traffic. Computer 702 may further comprise multiple communications network interfaces and multiple test network interfaces. In some instances, the communications network 726 and the test network 724 may be the same. Computers are well known in the art and will not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for characterizing a packet data network comprising a source node, a plurality of receiver nodes, and a plurality of paths, wherein each path in the plurality of paths connects the source node with one of the plurality of receiver nodes and wherein each of the paths comprises a plurality of links, the method comprising:
  recording at each of the plurality of receiver nodes arrivals of a plurality of multicast probe messages transmitted from the source node; and,
  calculating a probability that a length of a pass-run or a length of a loss-run exceeds a specific value for each link in the plurality of links for each path in the plurality of paths by inference from the recorded arrivals;
  wherein:
  none of the plurality of receiver nodes transmits a message to the source node in response to the arrivals of the plurality of multicast probe messages; and
  none of the plurality of receiver nodes transmits a message to any other of the plurality of receiver nodes in response to the arrivals of the plurality of multicast probe messages.

2. The method of claim 1 wherein a topology of the packet data network is a binary tree and wherein the binary tree is partitioned into two subtrees.

3. The method of claim 1 wherein a topology of the packet data network is an arbitrary tree.

4. The method of claim 3 wherein the arbitrary tree is partitioned into two subtrees.

5. A network characterization system for characterizing a packet data network comprising a source node, a plurality of receiver nodes, and a plurality of paths wherein each path in the plurality of paths connects the source node with one of the plurality of receiver nodes and wherein each of the paths comprises a plurality of links, the network characterization system comprising:
  means for recording at each of the plurality of receiver nodes arrivals of a plurality of multicast probe messages transmitted from the source node; and,
  means for calculating a probability that a length of a pass-run or a length of a loss-run exceeds a specific value for each link in the plurality of links for each path in the plurality of paths by inference from the recorded arrivals;
  wherein:
  none of the plurality of receiver nodes transmits a message to the source node in response to the arrivals of the plurality of multicast probe messages; and
  none of the plurality of receiver nodes transmits a message to any other of the plurality of receiver nodes in response to the arrivals of the plurality of multicast probe messages.

6. The network characterization system of claim 5, wherein a topology of the packet data network is a binary tree, further comprising:
  means for partitioning the binary tree into two subtrees.

7. The network characterization system of claim 5, wherein a topology of the packet data network is an arbitrary tree, further comprising:
  means for partitioning the arbitrary tree into two subtrees.

8. A non-transitory computer readable medium storing computer program instructions for characterizing a packet data network comprising a source node, a plurality of receiver nodes, and a plurality of paths wherein each path in the plurality of paths connects the source node with one of the plurality of receiver nodes and wherein each of the paths comprises a plurality of links, the computer program instructions defining:
  recording at each of the plurality of receiver nodes arrivals of a plurality of multicast probe messages transmitted from the source node; and,
  calculating a probability that a length of a pass-run or a length of a loss-run exceeds a specific value for each link in the plurality of links for each path in the plurality of paths by inference from the recorded arrivals;
  wherein:
  none of the plurality of receiver nodes transmits a message to the source node in response to the arrivals of the plurality of multicast probe messages; and
  none of the plurality of receiver nodes transmits a message to any other of the plurality of receiver nodes in response to the arrivals of the plurality of multicast probe messages.

9. The non-transitory computer readable medium of claim 8 wherein a topology of the packet data network is a binary tree and wherein the computer program instructions further comprise computer program instructions defining:
  partitioning the binary tree into two subtrees.

10. The non-transitory computer readable medium of claim 8 wherein a topology of the packet data network is an arbitrary tree and wherein the computer program instructions further comprise computer program instructions defining:
  partitioning the arbitrary tree into two subtrees.

* * * * *